(12) United States Patent
Masuda et al.

(10) Patent No.: US 6,984,347 B2
(45) Date of Patent: Jan. 10, 2006

(54) THERMO-EXPANSIVE MICROCAPSULES AND THEIR APPLICATION

(75) Inventors: Toshiaki Masuda, Yao (JP); Ichiro Takahara, Yao (JP); Takashi Hujie, Yao (JP); Yoshiaki Shirakabe, Yao (JP); Katsushi Miki, Yao (JP)

(73) Assignee: Matsumoto Yushi-Seiyaku Co., Ltd., Osaka (JP)

( * ) Notice: Subject to any disclaimer, the term of this patent is extended or adjusted under 35 U.S.C. 154(b) by 0 days.

(21) Appl. No.: 10/923,811

(22) Filed: Aug. 24, 2004

(65) Prior Publication Data

US 2005/0026067 A1 Feb. 3, 2005

Related U.S. Application Data

(63) Continuation-in-part of application No. PCT/JP03/06409, filed on May 22, 2003.

(30) Foreign Application Priority Data

May 24, 2002 (JP) .............................. 2002-188728

(51) Int. Cl.
*C08J 9/16* (2006.01)
*C08J 9/18* (2006.01)
*B01J 13/02* (2006.01)
*B32B 15/02* (2006.01)

(52) U.S. Cl. ...................... 264/4.33; 264/4.7; 430/138; 428/402.22; 521/56; 521/60

(58) Field of Classification Search ............... 264/4.33, 264/4.7; 428/402.22; 521/56, 60; 430/138
See application file for complete search history.

(56) References Cited

U.S. PATENT DOCUMENTS

| 3,615,972 | A |   | 10/1971 | Morehouse, Jr. et al. |
| 4,287,308 | A | * | 9/1981 | Nakayama et al. ........... 521/53 |
| 5,536,756 | A |   | 7/1996 | Kida et al. |
| 6,235,394 | B1 |  | 5/2001 | Shimazawa et al. |
| 6,235,800 | B1 |  | 5/2001 | Kyuno et al. |
| 6,509,384 | B2 | * | 1/2003 | Kron et al. ................... 521/56 |

FOREIGN PATENT DOCUMENTS

| EP | 1059339 A1 | 12/2000 |
| EP | 1067151 A1 | 1/2001 |
| JP | 42-26524 | 12/1967 |
| JP | 62-286534 A | 12/1987 |
| JP | 5-285376 A | 11/1993 |
| JP | 10-53756 A | 2/1998 |
| JP | 11-2615 A | 1/1999 |
| WO | WO-99/43758 A1 | 9/1999 |

\* cited by examiner

*Primary Examiner*—Richard L. Schilling
(74) *Attorney, Agent, or Firm*—Birch Stewart Kolasch & Birch LLP

(57) ABSTRACT

Thermo-expansive microcapsules comprising a shell of a polymer produced by polymerizing a mixture of monomers, which comprises (I) a nitrile monomer, (II) a monomer having an unsaturated double bond and carboxyl groups in a molecule, (III) a monomer having two or more of polymerizable double bonds in a molecule, and optionally, (IV) a monomer different from and copolymerizable with the monomers (I), (II) and (III) and a blowing agent encapsulated in the shell. The volume retention of the expanded microcapsules of the thermo-expansive microcapsules is 50% or more after loaded with 15 MPa.

16 Claims, No Drawings

THERMO-EXPANSIVE MICROCAPSULES AND THEIR APPLICATION

This application is a Continuation-In-Part of copending PCT International Application No. PCT/JP03/06409 filed on May 22, 2003, which designated the United States, and on which priority is claimed under 35 U.S.C. § 120. This application also claims priority under 35 U.S.C. § 119(a) on Patent Application No(s). 2002-188728 filed in Japan on May 24, 2002. The entire contents of each of the above documents is hereby incorporated by reference.

FIELD OF INVENTION

The present invention relates to thermo-expansive microcapsules and their application, more particularly, to thermo-expansive microcapsules, which exhibit superior expanding performance over a wide temperature range, and the application thereof.

TECHNICAL BACKGROUND

A number of thermo-expansive microcapsules, which comprise thermoplastic polymer forming their wall and low-boiling-point solvent being encapsulated in the wall as core material, have been studied. JP-B 42-26524 (the term "JP-B" as used herein means an "examined Japanese patent publication") disclosed an overall process for producing thermo-expansive microcapsules. JP-A 62-286534 and JP-A 5-285376(the term "JP-A" as used herein means an "unexamined published Japanese patent application") (corresponding to U.S. Pat. No. 5,536,756) disclosed the production processes for heat-resistant thermo-expansive microcapsules, wherein the heat resistance of the microcapsules is improved by forming their wall with 80% or more of acrylonitrile monomers or with monomers polymerizable into a high-glass-transition-point homopolymer to raise the initial expanding temperature of the microcapsules, and by adding a small quantity of radical polymerizable polyfunctional monomers to those wall-forming monomers to thermo-polymerize the wall-forming monomers and to harden the wall of the microcapsules when they are thermally expanded. For attaining a desirable effect in those processes, the wall-forming monomers should be crosslinked instantly with high degree of cross-linking when the microcapsules are heated.

WO99/43758 disclosed the thermo-expansive microcapsules that can be applied at high temperature. The disclosed microcapsules are imparted with heat resistance by the thermosetting resin in wall-forming material, the resin which contains functional groups reactive with carboxyl groups in the wall-forming material and hardens simultaneously with the thermo-expanding of the microcapsules. The resultant expanded microcapsules are characterized by their glassy brittle wall (shell), and thus they are completely different from elastic microcapsules. Such microcapsules are incorporated into very hard or inelastic matrices, and are not preferable to be incorporated into matrices processed into transformable porous products because the microcapsules may sometimes deteriorate the property of those resin matrices.

Thermo-expansive microcapsules similar to the above-mentioned microcapsules have been conventionally developed by employing copolymers comprising nitrile monomers and acrylate or methacrylate monomers as major components for wall-forming materials. However, the expanding temperature of the thermo-expansive microcapsules, of which wall-forming materials comprise copolymers of those monomers, is limited in a narrow range, and especially in high temperature region.

DISCLOSURE OF INVENTION

The inventors of the present invention have studied the needs of the thermo-expansive microcapsules having superior expanding performance over a wide temperature range, especially in high temperature region, such as 160° C. and higher, investigated those microcapsules, and completed the present invention.

The object of the present invention is to provide microcapsules expanding constantly in high temperature region with high expanding rate to become highly elastic microcapsules which are thermoplastic and stable in soft or thick resin matrices.

The further object of the present invention is to provide the application of the above-mentioned microcapsules.

The above mentioned objects and the advantage of the present invention are attained, first, by thermo-expansive microcapsules comprising a shell of a polymer produced by polymerizing a mixture of monomers, which comprises (I) a nitrile monomer, (II) a monomer having an unsaturated double bond and carboxyl groups in a molecule, (III) a monomer having two or more of polymerizable double bonds in a molecule, and optionally, (IV) a monomer different from and copolymerizable with the monomers (I), (II) and (III) and a blowing agent encapsulated in the shell. The microcapsules preferably exhibit their maximum expanding performance at 160° C. or higher temperature.

The above mentioned objects and the advantage of the present invention are attained, second, by the resin composition comprising resins and the thermo-expansive microcapsules of the present invention or expanded microcapsules thereof.

BEST MODE OF EMBODIMENT

The (I) nitrile monomers applicable for the present invention may be, for example, acrylonitrile, methacrylonitrile, α-chloracrylonitrile, α-ethoxyacrylonitrile, fumaronitrile and the mixture thereof. Among those, acrylonitrile and/or methacrylonitrile are preferable.

The amount of the nitrile monomers may range from 40 to 95 weight percent, preferably from 50 to 90 weight percent, of the mixture of polymerizable monomers. A nitrile monomer having an amount below 40 weight percent cannot attain the object of the present invention.

The (II) monomers containing an unsaturated double bond and carboxyl groups per a molecule may be, for example, acrylic acid (AA), methacrylic acid (MAA), itaconic acid, styrenesulfonic acid or its sodium salt, maleic acid, fumaric acid, citraconic acid, and the mixture thereof.

The amount of the (II) monomers containing an unsaturated double bond and carboxyl group per a molecule may range from 5 to 60 weight percent, preferably from 7 to 50 weight percent, of the mixture of polymerizable monomers. The object of the present invention cannot be attained easily by the (II) monomers having an amount above 60 weight percent and the (II) monomers having an amount below 5 weight percent results in poor expanding performance of microcapsules at high temperature region.

The (III) monomers containing two or more polymerizable double bonds per a molecule may be, for example, aromatic divinyl compounds such as divinyl benzene and divinyl naphthalene, allyl methacrylate, triacryl formal, tri-allyl isocyanate, ethylene glycol di(meth)acrylate, diethylene glycol di(meth)acrylate, triethylene glycol di(meth) acrylate, 1,4-butanediol di(meth)acrylate, 1, 9-nonanediol di(meth)acrylate, 1,10-decanediol di(meth)acrylate, PEG (200) di(meth)acrylate, PEG(400) di(meth)acrylate, PEG (600) di(meth)acrylate, neopentyl glycol di(meth)acrylate, 1,6-hexanediol di(meth)acrylate, trimethylolpropane tri (meth)acrylate, EQ-modified trimethylolpropane tri(meth) acrylate, glycerin di(meth)acrylate, dimethylol tricyclodecane di(meth)acrylate, pentaerythritol tri(meth)acrylate, pentaerythritol tetra(meth)acrylate, dipentaerythritol hexa (meth)acrylate, neopentylglycol acrylic-benzoic ester, trimethylolpropane acrylic-benzoic ester, 2-hydroxy-3-acryloyloxypropyl(meth)acrylate, hydroxypivalic neopentylglycol di(meth)acrylate, ditrimethylolpropane tetra(meth)acrylate, 2-butyl-2-ethyl-1, 3-propanediol di(meth)acrylate, polytetramethylene glycol di(meth)acrylate, phenylglycidylether acrylate hexamethylene diisocyanate urethane prepolymer, phenylglycidylether acrylate toluenediisocyanate urethane prepolymer, pentaerythritol triacrylate hexamethylene diisocyanate urethane prepolymer, pentaerythritol triacrylate toluenediisocyanate urethane prepolymer, pentaerythritol triacrylate isophorone diisocyanate urethane prepolymer, and the mixture thereof.

The amount of the (III) monomers containing two or more polymerizable double bonds per a molecule may range from 0.0 1 to 5 weight percent, preferably from 0.2 to 1.5 weight percent, of the mixture of polymerizable monomers. The (III) monomers having an amount below 0.01 weight percent or above 5 weight percent results in poor expanding performance of microcapsules at high temperature region and cannot attain easily the object of the present invention.

The (IV) monomers are different from the above-mentioned monomers (I), (II) and (III), and are polymerizable with those monomers.

The (IV) monomers are added to control the expanding performance of the shell polymer of resultant microcapsules. The (IV) monomers may be, for example, monomers of which the polymerization proceeds by radical initiators and their mixtures, such as: vinylidene chloride; vinyl acetate; (meth)acrylates (e.g. methyl(meth)acrylate, ethyl(meth) acrylate, n-butyl (meth)acrylate, isobutyl(meth)acrylate, t-butyl(meth)acrylate, isobornyl(meth)acrylate, cyclohexyl (meth)acrylate, benzyl (meth)acrylate and β-carboxyethyl acrylate); styrene monomers (e.g. styrene sulfonate and its sodium salt, α-methyl styrene, and chlorostyrene); acrylamide; substituted acrylamides; methacrylamide; and substituted methacrylamides; and the mixture thereof.

The amount of the (IV) monomers may range from 0 to 20 weight percent, preferably from 0 to 15 weight percent, of the mixture of polymerizable monomers. The (IV) monomers having an amount above 20 weight percent cannot attain the object of the present invention.

It is preferable that the mixture of the polymerizable monomers of the present invention does not substantially contain such monomers, for example, N-methylol acrylamide, having functional groups reactive with the carboxyl groups contained in the (II) monomers.

A mixture of polymerizable monomers containing such monomers by 1 weight percent or more is not preferable because the resultant expanded microcapsules will be very hard and brittle.

The preferable polymerization initiators may be, for example, oil-soluble peroxides such as dialykyl peroxide, diacyl peroxide, peroxy acid ester, peroxy dicarbonate; azo compounds, and those having a half life of 1 to 25 hours at a temperature of polymerization. One of or a mixture of those polymerization initiators is applied in the suspension polymerization of the above-mentioned monomers to produce shell-forming polymer.

Preferable blowing agents employed for the present invention may be the liquids having a boiling point lower than the softening temperature of the shell polymer of thermo-expansive microcapsules. The examples of such blowing agents are linear $C_{3-8}$ aliphatic hydrocarbons and their fluoro compounds; branched $C_{3-8}$ aliphatic hydrocarbons and their fluoro compounds; linear $C_{3-8}$ aliphatic cyclic hydrocarbons and their fluoro compounds; ether compounds containing $C_{2-8}$ hydrocarbon groups, and ether compounds containing $C_{2-8}$ hydrocarbon groups of which hydrogen atoms are partially substituted by fluorine atoms. Those compounds may be, specifically, propane, cyclopropane, butane, cyclobutane, isobutane, pentane, cyclopentane, neopentane, isopentane, hexane, cyclohexane, 2-methyl pentane, 2,2-dimethyl butane, heptane, cycloheptane, octane, cyclooctane, methyl heptanes, trimethyl pentanes, and hydrofluoro ethers such as $C_3F_7OCH_3$, $C_4F_9OCH_3$ and $C_4F_9OC_2H_5$. One of or a mixture of those compounds is applied.

The thermo-expansive microcapsules of the present invention can be produced in suspension polymerization, a conventional process. The suspension polymerization of thermo-expansive microcapsules is usually carried out by dispersing a mixture of polymerizable monomers and a blowing agent in an aqueous dispersion medium containing a dispersant, and by polymerizing the mixture of polymerizable monomers in the presence of the blowing agent. For the dispersant in the aqueous dispersion medium, for example, inorganic fine particles such as silica, magnesium hydroxide, calcium phosphate and aluminum hydroxide are employed. In addition, the condensation products of diethanolamine and aliphatic dicarboxylic acids, polyvinyl pyrrolidone, methyl cellulose, polyethylene oxide, polyvinyl alcohol and vazious emulsifiers are employed as the auxiliary for stabilizing the dispersion.

With such process, thermo-expansive microcapsules having a highest expanding temperature of 160° C. or more, preferably 170° C. or more, and more preferably 190° C. or more, can be produced. The resultant thermo-expansive microcapsules expand constantly with high expanding ratio in a high-temperature region, preferably at 160° C. or more, and expanded microcapsules exhibit high elasticity.

The expanded microcapsules of the thermo-expansive microcapsules of the present invention may exhibit volume retention of 50% or more, preferably 70% of more, and more preferably 80% or more, after being loaded with 15 MPa.

The thermo-expansive microcapsules produced in the process of the present invention and the expanded microcapsules thereof can be incorporated in various resins to be processed in molding. Thus light-weight resin composition can be produced. The molding can be carried out with conventional processes, such as calendaring, extrusion molding, blow molding and injection molding.

Applicable resins may be, for example, thermoplastic resins such as rubber, polyethylene, polypropylene, polystyrene and polyvinylidene chloride; and thermosetting resins such as urethane resins and epoxy resins.

EXAMPLES

The present invention is described specifically with the following examples.

Example 1

An aqueous dispersion medium was prepared by mixing 40 g of colloidal silica containing 40 weight percent of solid, 1 g of diethanolamine-adipic acid condensate, 150 g of sodium chloride and 500 g of deionized water and by controlling the pH of the mixture into 3.5.

A uniform solution of the mixture of monomers was prepared by mixing 100 g of acrylonitrile, 100 g of methacrylonitrile, 10 g of methacrylic acid, 1 g of ethylene glycol dimethacrylate and 1 g of azobis(2,4-dimethylvaleronitrile), and the solution was transferred in an autoclave together with isobutane and isopentane to be mixed. Then the aqueous dispersion medium was transferred in the autoclave, and the mixture was agitated at 700 rpm for 5 minutes, purged with nitrogen, and reacted at 60° C. for 8 hours. The reaction was carried out with a pressure of 0.5 MPa and agitation at 350 rpm.

The thermo-expanding performance of the thermo-expansive microcapsules produced in the above reaction was analyzed with a TMA-7, a tester produced by Perkin-Elmer Co., Ltd., according to the procedure disclosed in JP-A 11-002615. As a result, the thermo-expansive microcapsules exhibited an initial expanding temperature of 105° C. and a maximum expanding temperature of 175° C.

Then the expanding performance of the microcapsules in a SBS (styrene-butadiene block copolymer) resin was tested. The SBS resin and 1 weight percent of the thermo-expansive microcapsules produced in the process of Example 1 were mixed, formed into sheet and heated at 160° C. Then the specific gravity of the mixture of the SBS resin and the microcapsules became 0.45, being much lower than 0.9, the specific gravity of the SBS resin.

Then the mixture of 97.5 weight percent of a SBS resin (TR2787, produced by JSR Corporation, with a density of 0.94 g/cm$^3$, and a melt flow rate of 6.0 g/10 minutes at 200° C. and 49.0 N) and 2.5 weight percent of the thermo-expansive microcapsules was injection-molded with an injection-molding machine, of which mold locking force was about 80 tons and a screw diameter was 32 mm, with an injection pressure of 1000 kg/cm$^2$ and a cylinder temperature of 150 to 190° C., to be produced into a disk-shaped product of 98 mm in diameter and 3 mm thick. The result is shown in Table 1.

Comparative Example 1

Thermo-expansive microcapsules were produced in the same manner as in Example 1 except that methacrylic acid was not employed.

The thermo-expanding performance of the resultant thermo-expansive microcapsules was analyzed with a TMA-7, a tester produced by Perkin-Elmer Co., Ltd., and the thermo-expansive microcapsules exhibited an initial expanding temperature of 105° C. and a maximum expanding temperature of 155° C.

Then the expanding performance of the microcapsules in a SBS resin was tested. The SBS resin and 1 weight percent of the thermo-expansive microcapsules produced in the process of Comparative example 1 were mixed, formed into sheet and heated at 160° C. Then the specific gravity of the mixture of the SBS resin and the microcapsules became 0.7, being lower than 0.9, the specific gravity of the SBS resin.

Then the injection-molding was carried out in the same manner as in Example 1. The result is shown in Table 1.

TABLE 1

| Thermo-expansive microcapsules used | Injection molding temperature (° C.) | Density (g/cm$^3$) | Percentage lightened |
|---|---|---|---|
| Example 1 | 150 | 0.70 | 23.5 |
|  | 170 | 0.72 | 23.4 |
|  | 190 | 0.80 | 14.8 |
| Comparative example 1 | 150 | 0.79 | 16.0 |
|  | 170 | 0.83 | 11.7 |
|  | 190 | 0.87 | 7.4 |

Example 2

An aqueous dispersion medium was prepared by mixing 40 g of colloidal silica containing 40 weight percent of solid, 1 g of diethanolamine-adipic acid condensate, 160 g of sodium chloride and 500 g of deionized water and by controlling the pH of the mixture into 3.5.

A uniform solution of the mixture of monomers was prepared by mixing 50 g of acrylonitrile, 50 g of methacrylonitrile, 120 g of methacrylic acid, 3 g of ethylene glycol dimethacrylate and 1 g of azobis(2,4-dimethylvaleronitrile), and the solution was transferred in an autoclave together with 20 g of 2-methyl pentane and 15 g of 2,2,4-trimethyl pentane to be mixed. Then the aqueous dispersion medium was transferred in the autoclave, and the mixture was agitated at 700 rpm for 5 minutes, purged with nitrogen, and reacted at 60° C. for 8 hours. The reaction was carried out with a pressure of 0.5 MPa and agitation at 350 rpm.

The thermo-expanding performance of the thermo-expansive microcapsules produced in the above reaction was analyzed with a TMA-7, a tester produced by Perkin-Elmer Co., Ltd., and the thermo-expansive microcapsules exhibited an initial expanding temperature of 190° C. and a maximum expanding temperature of 260° C.

Then the injection-molding was carried out in the same manner as in Example 1 except that the cylinder temperature ranged from 190 to 250° C. The result is shown in Table 2.

Comparative Example 2

Thermo-expansive microcapsules were produced in the same manner as in Example 2 except that methacrylic acid was not employed.

The thermo-expanding performance of the resultant thermo-expansive microcapsules was analyzed with a TMA-7, a tester produced by Perkin-Elmer Co., Ltd., and the thermo-expansive microcapsules exhibited an initial expanding temperature of 182° C. and a maximum expanding temperature of 206° C.

Then the injection-molding was carried out in the same manner as in Example 2. The result is shown in Table 2.

TABLE 2

| Thermo-expansive microcapsules used | Injection molding temperature (° C.) | Density (g/cm³) | Percentage lightened |
|---|---|---|---|
| Example 2 | 190 | 0.88 | 6.4 |
| | 210 | 0.81 | 13.8 |
| | 230 | 0.75 | 20.2 |
| | 250 | 0.69 | 26.6 |
| Comparative example 2 | 190 | 0.79 | 16.0 |
| | 210 | 0.81 | 13.8 |
| | 230 | 0.88 | 6.4 |
| | 250 | 0.89 | 5.3 |

Example 3

An aqueous dispersion medium was prepared by mixing 45 g of colloidal silica containing 40 weight percent of solid, 1 g of diethanolamine-adipic acid condensate, 140 g of sodium chloride and 500 g of deionized water and by controlling the pH of the mixture into 3.5.

A uniform solution of the mixture of monomers was prepared by mixing 70 g of acrylonitrile, 70 g of methacrylonitrile, 70 g of methacrylic acid, 3 g of ethylene glycol dimethacrylate and 1 g of azobis(2,4-dimethylvaleronitrile), and the solution was transferred in an autoclave together with 20 g of isopentane and 30 g of 2-methyl pentane to be mixed. Then the aqueous dispersion medium was transferred in the autoclave, and the mixture was agitated at 700 rpm for 5 minutes, purged with nitrogen, and reacted at 60° C. for 8 hours. The reaction was performed under a pressure of 0.5 MPa and agitation at 350 rpm.

The thermo-expanding performance of the thermo-expansive microcapsules produced in the above reaction was analyzed with a TMA-7, a tester produced by Perkin-Elmer Co., Ltd., and the thermo-expansive microcapsules exhibited an initial expanding temperature of 160° C. and a maximum expanding temperature of 200° C.

Then the injection-molding was carried out in the same manner as in Example 1 except that the cylinder temperature ranged from 150 to 210° C. The result is shown in Table 3.

Comparative Example 3

Thermo-expansive microcapsules were produced in the same manner as in Example 3 except that methacrylic acid was not employed.

The thermo-expanding performance of the resultant thermo-expansive microcapsules was analyzed with a TMA-7, a tester produced by Perkin-Elmer Co., Ltd., and the thermo-expansive microcapsules exhibited an initial expanding temperature of 153° C. and a maximum expanding temperature of 175° C.

Then the injection-molding was carried out in the same manner as in Example 3. The result is shown in Table 3.

TABLE 3

| Thermo-expansive microcapsules used | Injection molding temperature (° C.) | Density (g/cm³) | Percentage lightened |
|---|---|---|---|
| Example 3 | 150 | 0.71 | 24.5 |
| | 170 | 0.66 | 29.7 |
| | 190 | 0.68 | 27.7 |
| | 210 | 0.81 | 13.8 |

TABLE 3-continued

| Thermo-expansive microcapsules used | Injection molding temperature (° C.) | Density (g/cm³) | Percentage lightened |
|---|---|---|---|
| Comparative example 3 | 150 | 0.67 | 28.7 |
| | 170 | 0.73 | 22.3 |
| | 190 | 0.81 | 13.8 |
| | 210 | 0.87 | 7.4 |

Example 4

An aqueous dispersion medium was prepared by mixing 45 g of colloidal silica containing 40 weight percent of solid, 1 g of diethanolamine-adipic acid condensate, 140 g of sodium chloride and 500 g of deionized water and by controlling the pH of the mixture into 3.5.

A uniform solution of the mixture of monomers was prepared by mixing 70 g of acrylonitrile, 70 g of methacrylonitrile, 70 g of itaconic acid, 3 g of ethylene glycol dimethacrylate, 10 g of α-methyl styrene and 1 g of azobis (2,4-dimethylvaleronitrile), and the solution was transferred in an autoclave together with 20 g of isopentane and 30 g of 2-methyl pentane to be mixed. Then the aqueous dispersion medium was transferred in the autoclave, and the mixture was agitated at 700 rpm for 5 minutes, purged with nitrogen and reacted at 60° C. for 8 hours. The reaction was carried out with a pressure of 0.5 MPa and agitation at 350 rpm.

The thermo-expanding performance of the thermo-expansive microcapsules produced in the above reaction was analyzed with a TMA-7, a tester produced by Perkin-Elmer Co., Ltd., and the thermo-expansive microcapsules exhibited an initial expanding temperature of 163° C. and a maximum expanding temperature of 210° C.

Then the injection-molding was carried out in the same manner as in Example 1. The result is shown in Table 4.

Comparative Example 4

Thermo-expansive microcapsules were produced in the same manner as in Example 4 except that itaconic acid was not employed.

The thermo-expanding performance of the resultant thermo-expansive microcapsules was analyzed with a TMA-7, a tester produced by Perkin-Elmer Co., Ltd., and the thermo-expansive microcapsules exhibited an initial expanding temperature of 160° C. and a maximum expanding temperature of 183° C.

Then the injection-molding was carried out in the same manner as in Example 1. The result is shown in Table 4.

TABLE 4

| Thermo-expansive microcapsules used | Injection molding temperature (° C.) | Density (g/cm³) | Percentage lightened |
|---|---|---|---|
| Example 4 | 150 | 0.83 | 11.7 |
| | 170 | 0.70 | 25.5 |
| | 190 | 0.65 | 30.9 |
| | 210 | 0.72 | 23.4 |
| Comparative example 4 | 150 | 0.83 | 11.7 |
| | 170 | 0.78 | 17.0 |
| | 190 | 0.83 | 11.7 |
| | 210 | 0.89 | 5.3 |

Example 5

An aqueous dispersion medium was prepared by mixing 40 g of colloidal silica containing 40 weight percent of solid, 1 g of diethanolamine-adipic acid condensate, 150 g of sodium chloride and 500 g of deionized water and by controlling the pH of the mixture into 3.5.

A uniform solution of the mixture of monomers was prepared by mixing 100 g of acrylonitrile, 100 g of methacrylonitrile, 10 g of methacrylic acid, 1 g of ethylene glycol dimethacrylate, and 1 g of azobis(2,4-dimethylvaleronitrile), and the solution was transferred in an autoclave together with 64 g of isopentane to be mixed. Then the aqueous dispersion medium was transferred in the autoclave, and the mixture was agitated at 700 rpm for 5 minutes, purged with nitrogen and reacted at 60° C. for 8 hours. The reaction was carried out with a pressure of 0.5 MPa and agitation at 350 rpm.

The thermo-expanding performance of the thermo-expansive microcapsules produced in the above reaction was analyzed with a TMA-7, a tester produced by Perkin-Elmer Co., Ltd., and the thermo-expansive microcapsules exhibited an initial expanding temperature of 140° C. and a maximum expanding temperature of 197° C.

Comparative Example 5

An aqueous dispersion medium was prepared by mixing 25 g of colloidal silica containing 40 weight percent of solid, 0.6 g of diethanolamine-adipic acid condensate, 55 g of sodium chloride and 160 g of deionized water and by controlling the pH of the mixture into 3.5.

A uniform solution of the mixture of monomers was prepared by mixing 45 g of acrylonitrile, 16 g of N,N-dimethyl acrylamide, 5 g of N-methylol acrylamide, 23 g of methacrylic acid, 0.1 g of ethylene glycol dimethacrylate, and 0.3 g of azobisisobutylonitrile, and the solution was transferred in an autoclave together with 15 g of isopentane to be mixed. Then the aqueous dispersion medium was transferred in the autoclave, and the mixture was agitated at 700 rpm for 5 minutes, purged with nitrogen and reacted at 70° C. for 20 hours. The reaction was carried out with a pressure of 0.5 MPa and agitation at 350 rpm.

The thermo-expanding performance of the thermo-expansive microcapsules produced in the above reaction was analyzed with a TMA-7, a tester produced by Perkin-Elmer Co., Ltd., and the thermo-expansive microcapsules exhibited an initial expanding temperature of 141° C. and a maximum expanding temperature of 200° C.

Then the volume retention (%), before and after loading, of the obtained expanded microcapsules of the thermo-expansive microcapsules was evaluated. The volume retention of the thermo-expanding microcapsules produced with and without the (II) monomer containing carboxyl groups was compared by comparing the thermo-expanding microcapsules of Examples 1 to 4 and Comparative examples 1 to 4. The volume retention of the thermo-expanding microcapsules produced with and without a monomer containing functional groups reactive with the carboxyl groups of the (II) monomer was compared by comparing the thermo-expanding microcapsules of Example 5 and Comparative example 5.

The volume retention was obtained by determining the true specific gravity of expanded microcapsule before loading (D1) and after loading (D2) and by calculating those values by the following formula.

Volume retention (%)={1−(D2−D1)/D1}×100

The volume retention of the microcapsules of the present invention may be 50% or more, preferably 70% or more, and more preferably 80% or more. Microcapsules having less than 50% of volume retention are not preferable for incorporating in transformable resins because they may deteriorate the property of such resins after expanding, though they are sufficient for producing porous products that do not transform.

The loading on expanded microcapsules were carried out by filling expanded microcapsules in a stainless cylinder with 12.5 mm of inside diameter at 25° C. and by pressing them with a piston with optional pressure for 0.5 hour.

X means that the volume retention after loading with 15 MPa is less than 50%, Δ means that the volume retention is 50% or more and less than 70%, ○ means that the volume retention is 70% or more and less than 80%, and ⊚ means that the volume retention is 80% or more.

The result is shown in Table 5.

TABLE 5

| | Volume retention (%) | | | | |
|---|---|---|---|---|---|
| Expanded microcapsules | Loading with 1.0 MPa | Loading with 2.0 MPa | Loading with 4.0 MPa | Loading with 15 MPa | Evaluation |
| Example 1 | 96 | 95 | 90 | 87 | ⊚ |
| Comparative example 1 | 97 | 95 | 92 | 89 | ⊚ |
| Example 2 | 95 | 94 | 89 | 82 | ⊚ |
| Comparative example 2 | 97 | 96 | 92 | 87 | ⊚ |
| Example 3 | 96 | 94 | 92 | 85 | ⊚ |
| Comparative example 3 | 96 | 95 | 93 | 88 | ⊚ |
| Example 4 | 96 | 93 | 89 | 83 | ⊚ |
| Comparative example 4 | 96 | 94 | 92 | 84 | ⊚ |
| Example 5 | 96 | 93 | 88 | 85 | ⊚ |
| Comparative example 5 | 78 | 47 | 13 | 11 | X |

The volume retention of expanded microcapsules at high temperature was then evaluated.

The loading on the expanded microcapsules was carried out by filling the expanded microcapsules in a stainless cylinder with 12.5 mm of inside diameter at 140° C. and by pressing them with a piston with optional pressure for 0.5 hour.

X means that the volume retention after loading with 15 MPa is less than 50%, Δ means that the volume retention is 50% or more and less than 70%, ○ means that the volume retention is 70% or more and less than 80%, and ⊚ means that the volume retention is 80% or more.

The evaluation results are shown in Table 6.

TABLE 6

| | Volume retention (%) | | | | |
|---|---|---|---|---|---|
| Expanded microcapsules | Loading with 1.0 MPa | Loading with 2.0 MPa | Loading with 4.0 MPa | Loading with 15 MPa | Evaluation |
| Example 1 | 91 | 87 | 77 | 65 | Δ |
| Comparative example 1 | 89 | 83 | 75 | 60 | Δ |
| Example 2 | 94 | 88 | 85 | 80 | ⊚ |
| Comparative example 2 | 90 | 85 | 79 | 75 | ○ |
| Example 3 | 92 | 88 | 82 | 77 | ○ |
| Comparative example 3 | 90 | 84 | 78 | 72 | ○ |

TABLE 6-continued

| Expanded microcapsules | Volume retention (%) | | | | |
|---|---|---|---|---|---|
| | Loading with 1.0 MPa | Loading with 2.0 MPa | Loading with 4.0 MPa | Loading with 15 MPa | Evaluation |
| Example 4 | 91 | 87 | 82 | 76 | ○ |
| Comparative example 4 | 84 | 81 | 76 | 65 | Δ |
| Example 5 | 91 | 90 | 83 | 67 | Δ |
| Comparative example 5 | 76 | 44 | 15 | 10 | X |

The above result shows that the thermo-expansive microcapsules of the present invention may exhibit much superior performance to that of conventional thermo-expansive microcapsules in expanding at high temperature, and in the volume retention of expanded microcapsules at high temperature after loading owing to the high elasticity of the expanded microcapsules.

As described above, the thermo-expansive microcapsules of the present invention can be applied in various fields of extrusion and injection molding of resins owing to their sufficient expanding performance in their application temperature, especially in high temperature region, and their controllable initial expanding temperature. With such performance, the thermo-expansive microcapsules can lighten resin products, improve their durability and impart insulating and soundproofing performance.

What is claimed is:

1. Thermo-expansive microcapsules comprising a shell of a polymer produced by polymerizing a mixture of monomers, which comprises 40 to 95 weight percent of (I) a nitrile monomer, 7 to 50 weight percent of (II) a monomer having an unsaturated double bond and a carboxyl group in a molecule, 0.01 to 5 weight percent of (III) a monomer having two or more of polymerizable double bonds in a molecule, and optionally, 0 to 15 weight percent of (IV) a monomer different from and copolymerizable with the monomers (I), (II) and (III) and a blowing agent encapsulated in the shell, wherein the mixture of monomers does not substantially contain a monomer having a functional group reactive with the carboxyl group contained in the (II) monomer.

2. The thermo-expansive microcapsules of claim 1, of which expanded microcapsules have a volume retention of 50% or more after loaded with 15 MPa at 25° C. and/or 140° C.

3. The thermo-expansive microcapsules of claim 1 or 2, wherein a polymerization initiator for polymerizing the mixture of monomers is an oil-soluble peroxide, an azo compound or a substance having a half life of 1 to 25 hours at a polymerization temperature.

4. The thermo-expansive microcapsules of claim 1 or 2, of which maximum expanding temperature is 160° C. or higher.

5. Resin compositions comprising the thermo-expansive microcapsules of claim 1 or expanded microcapsules thereof, and a resin.

6. The thermo-expansive microcapsules of claim 1, wherein the content of the monomer having a functional group reactive with the carboxyl group contained in the (II) monomer is less than 1 weight percent of the mixture of monomers.

7. The thermo-expansive microcapsules of claim 6, wherein the (IV) monomer includes at least one member selected from the group consisting of vinylidene chloride, vinyl acetate, (meth)acrylates, styrene monomers, acrylamide, and methacrylamide.

8. The thermo-expansive microcapsules of claim 6, wherein the (meth)acrylates are methyl(meth)acrylate, ethyl (meth)acrylate, n-butyl(meth)acrylate, isobutyl(meth)acrylate, t-butyl(meth)acrylate, isobomyl(meth)acrylate, cyclohexyl(meth)acrylate, benzyl(meth)acrylate, and β-carboxyethyl acrylate.

9. The thermo-expansive microcapsules of claim 6, of which expanded microcapsules have a volume retention of 50% or more after loaded with 15 MPa at 25° C. and/or 140° C.

10. The thermo-expansive microcapsules of claim 6, of which maximum expanding temperature is 160° C. or higher.

11. Resin compositions comprising the thermo-expansive microcapsules of claim 6 or expanded microcapsules thereof, and a resin.

12. Thermo-expansive microcapsules comprising a shell of a polymer produced by polymerizing a mixture of monomers, which comprises 40 to 95 weight percent of (I) a nitrile monomer, 7 to 50 weight percent of (II) a monomer having an unsaturated double bond and a carboxyl group in a molecule, 0.01 to 5 weight percent of (III) a monomer having two or more of polymerizable double bonds in a molecule, and optionally, 0 to 20 weight percent of (IV) a monomer different from and copolymerizable with the monomers (I), (II) and (III) and a blowing agent encapsulated in the shell, wherein the (IV) monomer includes at least one member selected from the group consisting of vinylidene chloride, vinyl acetate, methyl(meth)acrylate, ethyl(meth)acrylate, n-butyl(meth)acrylate, isobutyl(meth) acrylate, t-butyl(meth)acrylate, isobomyl(meth)acrylate, cyclohexyl(meth)acrylate, benzyl(meth)acrylate, β-carboxyethyl acrylate, styrene monomers, acrylamide, and methacrylamide, and of which expanded microcapsules have a volume retention of 50% or more after loaded with 15 MPa at 25° C. and/or 140° C.

13. The thermo-expansive microcapsules of claim 12, of which maximum expanding temperature is 160° C. or higher.

14. Resin compositions comprising the thermo-expansive microcapsules of claim 12 or expanded microcapsules thereof, and a resin.

15. Thermo-expansive microcapsules comprising a shell of a polymer produced by polymerizing a mixture of monomers, which comprises 40 to 95 weight percent of (I) a nitrile monomer, 7 to 50 weight percent of (II) a monomer having an unsaturated double bond and a carboxyl group in a molecule, 0.01 to 5 weight percent of (III) a monomer having two or more of polymerizable double bonds in a molecule, and optionally, 0 to 15 weight percent of (IV) a monomer different from and copolymerizable with the monomers (I), (II) and (III) and a blowing agent encapsulated in the shell, and of which expanded microcapsules have a volume retention of 50% or more after loaded with 15 MPa at 25° C. and/or 140° C.

16. Resin compositions comprising the thermo-expansive microcapsules of claim 15 or expanded microcapsules thereof, and a resin.

* * * * *